US009822276B2

(12) United States Patent
Visnyak et al.

(10) Patent No.: US 9,822,276 B2
(45) Date of Patent: Nov. 21, 2017

(54) INKJET INK SET

(71) Applicant: Hewlett-Packard Development Company, L.P., Houston, TX (US)

(72) Inventors: Elizabeth Ann Visnyak, San Diego, CA (US); Ali Emamjomeh, San Diego, CA (US); George Sarkisian, San Diego, CA (US); David Michael Ingle, San Diego, CA (US); Minedys Macias Guzman, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/900,380

(22) PCT Filed: Aug. 14, 2013

(86) PCT No.: PCT/US2013/054971

§ 371 (c)(1),
(2) Date: Dec. 21, 2015

(87) PCT Pub. No.: WO2015/023274

PCT Pub. Date: Feb. 19, 2015

(65) Prior Publication Data

US 2016/0152858 A1 Jun. 2, 2016

(51) Int. Cl.

| | |
|---|---|
| ***C09D 11/54*** | (2014.01) |
| ***B41J 2/21*** | (2006.01) |
| ***C09D 7/12*** | (2006.01) |
| ***C09D 133/06*** | (2006.01) |
| ***B41M 7/00*** | (2006.01) |
| ***B41M 5/00*** | (2006.01) |
| ***C09D 11/12*** | (2006.01) |
| ***C09D 11/322*** | (2014.01) |
| ***C09D 11/40*** | (2014.01) |
| ***C09D 11/324*** | (2014.01) |

(52) U.S. Cl.

CPC ........ *C09D 133/062* (2013.01); *B41J 2/2107* (2013.01); *B41M 5/0011* (2013.01); *B41M 7/00* (2013.01); *C09D 7/1233* (2013.01); *C09D 11/12* (2013.01); *C09D 11/322* (2013.01); *C09D 11/324* (2013.01); *C09D 11/40* (2013.01); *C09D 11/54* (2013.01)

(58) Field of Classification Search

CPC ........................................................ B41J 2/2114

See application file for complete search history.

(56) References Cited

U.S. PATENT DOCUMENTS

| | | | | |
|---|---|---|---|---|
| 6,513,924 | B1 | 2/2003 | Goldberg et al. | |
| 8,356,892 | B2 | 1/2013 | Szajewski et al. | |
| 2005/0070629 | A1 | 3/2005 | Roberts | |
| 2005/0140763 | A1* | 6/2005 | Jackson | B41J 2/2114 347/100 |
| 2006/0251819 | A1* | 11/2006 | Zama | C08F 236/04 427/384 |
| 2007/0067928 | A1 | 3/2007 | Ellis | |
| 2007/0067982 | A1 | 3/2007 | Kobayashi | |
| 2010/0271433 | A1 | 10/2010 | Jolly et al. | |
| 2011/0193919 | A1* | 8/2011 | Chung | B41J 2/16552 347/85 |
| 2011/0300298 | A1 | 12/2011 | Kamibayashi et al. | |
| 2011/0303113 | A1 | 12/2011 | Sarkisian et al. | |
| 2012/0019588 | A1 | 1/2012 | Mubarekyan | |
| 2012/0176442 | A1 | 7/2012 | Robertson et al. | |
| 2012/0264040 | A1 | 10/2012 | Wu et al. | |
| 2013/0027451 | A1 | 1/2013 | Li | |
| 2013/0029045 | A1* | 1/2013 | Koganehira | C09D 137/00 427/256 |
| 2013/0076842 | A1 | 3/2013 | Sarkisian et al. | |

FOREIGN PATENT DOCUMENTS

| | | | | |
|---|---|---|---|---|
| CN | 101896561 | | 11/2010 | |
| CN | 102732100 | | 10/2012 | |
| CN | 102884145 | | 1/2013 | |
| EP | 0860296 | A1 * | 8/1998 | B41M 7/0081 |
| EP | 1148104 | | 10/2001 | |
| EP | 1462255 | | 9/2004 | |
| EP | 2623330 | | 8/2013 | |

OTHER PUBLICATIONS

International Search Report and Written Opinion for International Application No. PCT/US2013/054971 dated May 23, 2014, 11 pages.

* cited by examiner

*Primary Examiner* — Shelby Fidler

(74) *Attorney, Agent, or Firm* — Dieker & Kavanaugh, P.C.

(57) ABSTRACT

Examples provide inkjet ink sets and related methods. An ink set may include a pre-treatment fixing fluid, an ink, and a post-treatment fluid including a wax and a binder present in the post-treatment fluid in a range of about 10 weight percent to about 30 weight percent.

13 Claims, No Drawings

INKJET INK SET

BACKGROUND

Inkjet printing has become a popular way of recording images on various media surfaces, particularly paper and photo media substrates. Inkjet printers typically use an ink including a colorant and some combination of ingredients to achieve the desired print quality and/or printer performance. These printers commonly operate by dispensing the ink from a cartridge onto a surface of a print medium as the print medium is conveyed past a print head of an inkjet punter.

DETAILED DESCRIPTION

As a preliminary matter, it should be noted that in this description, various aspects of the illustrative implementations are described using terms commonly employed by those skilled in the art to convey the substance of their work to others skilled in the art. It will be apparent to those skilled in the art that alternate implementations may be practiced with only some of the described aspects. For purposes of explanation, specific numbers, materials, and configurations are set forth in order to provide a thorough understanding of the illustrative implementations. It will be apparent to one skilled in the art that alternate implementations may be practiced without the specific details. In other instances, well-known features may be omitted or simplified in order not to obscure the illustrative implementations.

It should also be noted that the phrases ‘in various implementations,” “in some implementations,” “in various examples,” “in some examples,” and the like, are used repeatedly. The phrases generally do not refer to the same implementations; however, they may. The terms “comprising,” “having,” and “including” are synonymous, unless the context dictates otherwise. The phrase “A and/or B” means (A), (B), or (A and B). The phrase “A/B” means (A), (B), or (A and B), similar to the phrase “A and/or B”. The phrase “at least one of A, B and C” means (A), (B), (C), (A and B), (A and C), (B and C) or (A, B and C). The phrase “(A) B” means (B) or (A and B), that is, A is optional.

Furthermore, concentrations, amounts, and other numerical data may be presented in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of “about 1 wt % to about 20 wt %” should be interpreted to include not only the explicitly recited values of about 1 wt % to about 5 wt %, but also include individual values 2 wt %, 3 wt %, and 4 wt %, and sub-ranges such as 5 wt % to 15 wt %, 10 wt % to 20 wt %, etc.

In addition, the inkjet ink sets and related methods described herein may be described with particular examples from non-exhaustive lists. Any combinations of material in various amounts that perform the functions described herein, however, may be within the scope of the principles described herein, unless indicated otherwise.

To provide a backdrop for the present disclosure, it is noted that some inkjet printing inks have been known to include a mixture of durability resin and pigment in the same ink to achieve a certain level of print durability. The amount and type of durability resin in the ink may be limited in the presence of the pigment in the same fluid due to the printer cartridge design and its thermal effects. Printer cartridge reliability may sometimes be an issue when ink solvents are optimized for a specific durability resin as the ink design space may be limited, with water-fast prints difficult to achieve.

Other print methods may use a roll-coated pre-treatment fluid containing a combination of calcium salts and durability resin to prime media before ink colorants are jetted onto the media. Although this method may provide bleed and coalescence control and improve image durability on coated offset media, the pre-treatment fluid floods the entire surface of the media even when area of the print media to be printed may be very low (e.g., 15% or less). In addition, the roller equipment may be costly, whose cost may be justified only for mid- to large-scale printing systems. Furthermore, this application to glossy offset media may be less than desirable due to poor web rub durability and loss of print gloss.

It has been recognized that separating specific compositional elements into a multiple-cartridge ink set can provide improved printing performance characteristics including durability and optical density, over a wide variety of applications. It is noted that when discussing the present compositions and methods, each of these discussions can be considered applicable to each of these embodiments, whether or not they are explicitly discussed in the context of that implementation. Thus, for example, in discussing a post-treatment fluid used in an ink set, such a post-treatment fluid may also be used in a method of producing images, and vice versa.

With the above in mind, described herein are various implementations of ink sets including an ink set comprising a pre-treatment fixing fluid, an ink, and a post-treatment fluid including a binder. The pre-treatment fixing fluid may include a metal salt, the ink may include an ink colorant and an ink vehicle, and the post-treatment fluid may include a wax and a binder present in the post-treatment fluid in a range of about 10 weight percent to about 30 weight percent. As the ink set may be adapted for separate inkjetting onto a media, the pre-treatment fixing fluid may be devoid of colorant and binder, the ink may be devoid of metal salt and binder, and the post-treatment fluid may be devoid of colorant and metal salt.

As used herein, the term “devoid of” when referring to a component (such as, e.g., a metal salt, a colorant, a binder, etc.) refers to a composition that does not include any added amount of the component, but may contain residual amounts, such as in the form of impurities. For example, components such as, for example, metal salts may be inherently present in residual or trace amounts in water or other vehicle components, and those concentrations may be present, provided they do not unfavorably interact with colorant or other ingredients. The components may be present in trace amounts, and in one aspect, in an amount of less than 0.1 weight percent (wt %) based on the total wt % of the composition (e.g., pre-treatment fluid, ink, or post-treatment fluid), even though the composition is described as being “devoid of” the component. In other words, “devoid of” of a component may mean devoid of added component but allows for trace amounts or impurities inherently present in certain ingredients.

Turning now to the pre-treatment fixing fluid, this composition may include a metal salt. In various implementations, the metal salt may flocculate pigment in the ink and control pigment migration. In various implementations, the metal salt may include a polyvalent metal cation. In other implementations, the metal salt may include a polyvalent metal cation selected from the group of $Ca^{2+}$, $Mg^{2+}$, or $Zn^{2+}$, and mixtures thereof. In one example, the polyvalent metal cation may be $Ca^{++}$. Additionally, such salts may include anions as well. Examples of anions include $Cl^-$, $I^-$, $Br^-$, $NO^{3-}$ or $RCOO^-$, where R is H or any hydrocarbon chain, e.g., from C1 to C8, branched or straight chained. The polyvalent metal salt component may be a divalent or a higher polyvalent metal cation and anion. In some examples, the polyvalent metal salt component may be soluble m water. Non-limiting examples of polyvalent metal cations include divalent metal cations, such as $Ca^{2+}$, $Cu^{2+}$, $Ni^{2+}$, $Mg^{2+}$, $Zn^{2+}$ and $Ba^{2+}$ or a combination thereof; trivalent metallic ions, such as $Al^{3+}$, $Fe^{3+}$ and $Cr^{3+}$ or a combination thereof. In one aspect, the polyvalent metal salt anion may be a chloride ($Cl^-$) or acetate ($CH_3COO^-$). In some examples, the polyvalent metal salt may be composed of divalent or polyvalent metallic ions and of nitrate or carboxylate ions. The carboxylate ions may be derived from a saturated aliphatic monocarboxylic acid having 1 to 6 carbon atoms or a carbocyclic monocarboxylic acid having 7 to 11 carbon atoms. Non-limiting examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid. In some examples, the polyvalent metal salt may be selected from a group consisting of calcium propionate, calcium chloride, calcium nitrate, magnesium nitrate, magnesium acetate or zinc acetate. In some other examples, the polyvalent metal salt may be calcium chloride or calcium nitrate ($CaCl_2$ or $Ca(NO_3)_2$). In yet some other examples, the polyvalent metal salt may be calcium chloride ($CaCl_2$). In yet some other examples, the polyvalent metal salt may be anhydrous.

The metal salt may be included in the pre-treatment fixing fluid at a concentration suitable for the particular implementation. In various implementations, a pre-treatment fluid may include metal salt present in the pre-treatment fixing fluid in a range of about 3 weight percent to about 10 weight percent. In an example, a pre-treatment fluid may include a calcium propionate metal salt present in the pre-treatment fixing fluid in a range of about 3 weight percent to about 10 weight percent. In another example, a pre-treatment fluid may include a calcium propionate metal salt present in the pre-treatment fixing fluid in a range of about 6 weight percent to about 9 weight percent. In yet another example, a pre-treatment fluid may include a calcium chloride metal salt present in the pre-treatment fixing fluid in a range of about 3 weight percent to about 6 weight percent. Various other implementations may be possible within the scope of the present disclosure.

Pre-treatment fixing fluids within the scope of the present disclosure may include a mixture of a variety of different agents. Such agents may include, but are limited to, solvents, buffers, surfactants, biocides, water, etc.

A pre-treatment fixing fluid may include a solvent present in total in the pre-treatment fixing fluid in a range from about 0.1 wt % to about 30 wt %, depending on the jetting architecture, though amounts outside of this range may also be used. Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In at least some implementations, the pre-treatment fixing fluid may include a tetraethylene glycol solvent.

Consistent with this disclosure, various additives may be employed to enhance the properties of the pre-treatment fixing fluid for specific applications. For example, non-ionic, cationic, and/or anionic surfactants may be present in total in the ink in a range from about 0.01 wt % to about 10 wt %. In at least some implementations, the pre-treatment fixing fluid may include SURFYNOL® SE-F surfactant (Air Products and Chemicals, Inc.). Other example additives may include, but are not limited to, water, buffers, antimicrobial agents, viscosity modifiers, materials for pH adjustment, sequestering agents, preservatives, and the like. In one example, the pre-treatment fixing fluid may be predominantly water. Buffers such as, for example, methanesulfonic acid, may be used to buffer the pH of the pre-treatment fixing fluid to a particular pH. In some examples, the buffer may buffer the pH of the pre-treatment fluid to a pH of about 6.0. Antimicrobial agents, such as biocides and fungicides, may be added to inhibit the growth of harmful microorganisms. Example antimicrobial agents may include, but are not limited to, the NUOSEPT® (Ashland Inc.), UCARCIDE™ (Dow Chemical Co.), and PROXEL® (Arch Chemicals) series, and combinations thereof.

With respect to the ink, in various implementations, the ink may include an ink colorant in an ink vehicle, in various implementations, an ink set may include a plurality of inks, each with an ink colorant and devoid of metal salt. Generally, any colorant may be used in the present inks. The colorant may be a pigment and in at least some of these implementations, the colorant may comprise a dispersant-stabilized pigment. In other implementations, the colorant may be a dye or a dye/pigment mix. As used herein, "dye" may refer to compounds or molecules that impart color to an ink. As such, dye may include molecules and compounds that absorb electromagnetic radiation or certain wavelengths thereof. For example, dyes may include those that fluoresce and those that absorb certain wavelengths of visible light. Generally, dyes may be water soluble. Furthermore, as used herein, "pigment" may generally include pigment colorants, magnetic particles, aluminas, silicas, and/or other ceramics, organo-metallics, metallic particulates, or other opaque particles.

Various implementations of inks including a pigment colorant may also include a pigment dispersant. In various implementations, the dispersant may be a styrene-acrylate-type dispersant such as, but not limited to, acrylic polymers having hydrophilic monomers including acid monomers, and hydrophobic monomers. In some examples, an ink may include styrene-acrylate-type dispersant present in the ink in amount of about 0.1 wt % to about 5 wt %. Hydrophobic monomers that can be polymerized in the acrylic dispersant may include, but are not limited to, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfufyl acrylate, isodecyl acrylate, isobornytmethacrylate, combinations thereof, derivatives thereof, and mixtures thereof.

Acidic monomers may be present in the acrylic dispersant at from about 0.1 wt % to about 30 wt %. Acidic monomers that may be used m the acrylic dispersant may include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylideacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsucanamidic acid, mesaconic acid, methacroylatanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethytenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the acrylic dispersants may include reactive surfactants such as functionalized ethylene glycol acrylates (such as, e.g., the SIPOMER® surfactant series from Rhodia). Other non-limiting examples of reactive surfactants may include HITENOL™ (polyoxyethylene alkylphenyl ether ammonium sulfate) and NOIGEN™ (polyoxyethylene alkylphenyl ether) reactive surfactants from Dai-Ichi Kogyo Seiyaku Co. Ltd.; TREM® (sulfosuccinates) from Henkel; and the MAXEMUL® (anionic phosphate ester) reactive surfactants from Uniqema. Suitable grades of some of the materials listed above may include HITENOL™ BC-20, NOIGEN™ RN-30, TREM® LT-40, and MAXEMUL® 6106 and 6112.

As used herein, "liquid vehicle" or "ink vehicle" may refer to the liquid fluid in which colorant is placed to form an ink. A wide variety of ink vehicles may be used with the ink sets and methods of the present disclosure. Such ink vehicles may include a mixture of a variety of different agents Such agents may include, but are limited to, solvents, surfactants, biocides, water, etc.

An ink vehicle may include a solvent present in total in the ink in a range from about 0.1 wt % to about 30 wt %, depending on the jetting architecture, though amounts outside of this range may also be used. Classes of co-solvents that can be used can include organic co-solvents including aliphatic alcohols, aromatic alcohols, diols, glycol ethers, polyglycol ethers, 2-pyrrolidinones, caprolactams, formamides, acetamides, glycols, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include a 2-hydroxyethyl-2-pyrrolidone solvent.

Consistent with this disclosure, various additives may be employed to enhance the properties of the ink for specific applications. For example, non-ionic, cationic, and/or anionic surfactants may be present in total in the ink in a range from about 0.01 wt % to about 10 wt %. In at least some implementations, the ink vehicle may include a silicone-free alkoxylated alcohol surfactant such as, for example, TEGO® Wet 510 (Evonik Tego Chemie GmbH). Other example additives may include, but are not limited to, water, antimicrobial agents, viscosity modifiers, materials for pH adjustment, sequestering agents, preservatives, and the like. In one example, the ink vehicle may be predominantly water Antimicrobial agents, such as biocides and fungicides, may be added to inhibit the growth of harmful microorganisms. Example antimicrobial agents may include, but are not limited to, the NUOSEPT® (Ashland Inc.). UCARCIDE™ (Dow Chemical Co.), and PROXEL® (Arch Chemicals) series, and combinations thereof.

Turning now to the post-treatment fluid, in various implementations, the post-treatment fluid may include a binder. The binder may be present in the post-treatment fluid at a content higher than comparative inkjet inks. For example, the binder may be present in the post-treatment fluid of at least 10 weight percent. In some implementations, the binder may be present in the post-treatment fluid in a range of about 12 weight percent to about 30 weight percent. In other implementations, the binder may be present in the post-treatment fluid in a range of about 20 weight percent to about 30 weight percent. Due at least in part to the separating of separating specific compositional elements into a multiple-cartridge ink set potential interaction between binder and colorant within a print cartridge can be avoided. For example, for comparative inkjet inks, print reliability may be impacted by nozzle clogging, and nozzle wiping to inhibit clogging tends to impact print speed and/or throughput. With the inkjet ink sets of the present disclosure, nozzle clogging may be decreased, allowing for nozzle wiping frequency to be also be decreased.

In various implementations, the binder may be a latex. In various implementations, the binder may include a water-soluble polyurethane or resin, instead of or in addition to latex. As used herein, "latex" or "latex resin" may refer to discrete polymer particles dispersed in the post-treatment fluid. In one example, the latex may be selected from a group consisting of acrylic polymers or copolymers, vinyl acetate polymers or copolymer polyester polymers or copolymers, vinylidene chloride polymers or copolymers, butadiene polymers or copolymers, styrene-butadiene polymers or copolymers, acrylonitrile-butadiene polymers or copolymers, and mixtures thereof. In another example, the latex in the post-treatment fluid may be an acrylic latex.

In some other examples, the latex resin may be a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin may be a polymer or a copolymer selected from a group consisting of acrylic polymers, vinyl-acrylic copolymers and acrylic-polyurethane copolymers. The latex resin may have a weight average molecular weight ($M_w$) of about 5,000 to about 500,000. The latex resin may have a weight average molecular weight ($M_w$) ranging from about 100,000 to about 500,000, without limitation. In some other examples, the latex resin may have a weight average molecular weight of about 150,000 to 300,000.

The average particle diameter of latex resin particles may be from about 10 nm to about 1 μm. In some other examples, the average particle diameter may be from about 10 nm to about 500 nm. In yet other examples, the average particle diameter may be from about 50 nm to about 250 nm. In still further examples, the average particle diameter may be from about 160 nm to about 220 nm. The particle size distribution of the latex is not particularly limited, and either latex having a broad particle size distribution or latex having a mono-dispersed particle size distribution may be used. It may also possible to use two or more kinds of latex particles each having a mono-dispersed particle size distribution in combination.

The latex resin components may include, but are not limited to, latex resins sold under the name HYCAR® or VYCAR® (Lubnzol Advanced Materials Inc.); RHOP- LEX® (Rohm & Hass Co.); NEOCAR® (Dow Chemical Co); AQUACER® (BYK Inc.) or LUCIDENE® (Rohm & Haas Co.).

Consistent with this disclosure, various additives may be employed to enhance the properties of the post-treatment fluid for specific applications. For example, non-ionic, cationic, and/or anionic surfactants may be present in total in the post-treatment fluid in a range from about 0.01 wt % to about 10 wt %. In at least some implementations, the post-treatment fluid may include a silicone-free alkoxylated alcohol surfactant (such as, e.g., TEGO® Wet 510, Evonik Tego Chemie GmbH) and (such as, e.g., UNITHOX™ 480, Baker Hughes Inc.), and the binder may be dispersed in an anionic surfactant (such as, e.g., DOWFAX™ 8390, Dow Chemical Co.).

The post-treatment fluid may include a solvent present in total in the post-treatment fixing fluid in a range from about 0.1 wt % to about 30 wt %, depending on the letting architecture, though amounts outside of this range may also be used. Classes of co-solvents that may be used can include organic co-solvents including aliphatic alcohols, aromatic alcohols, diols, glycol ethers, polyglycol ethers, 2-pyrrolidinones, caprolactams, formamides, acetamides, glycols, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink may include a 2-hydroxyethyl-2-pyrrolidone and di-(2-hydroxyethyl)-5,5-dimethylhydantoin (such as, e.g., DANTOCOL™ DHE, from Lonza Inc.) co-solvents.

The post-treatment fluid may include a wax. In various implementations, the wax may help improve the printing performance of the ink set at least with respect to durability. The wax may comprise any suitable wax including, for example, polyethylene wax (such as, e.g., LIQUILUBE™ 405, from Lubrizol Deutschland GmbH). A post-treatment fixing fluid may include a wax present in total in the post-treatment fixing fluid in a range from about 0.1 wt % to about 3.0 wt %, though amounts outside of this range may also be used. In some examples, the post-treatment fixing fluid may include the wax present in total in the post-treatment fixing fluid in a range from about 0.5 wt % to about 2.5 wt %.

Other example additives may include, but are not limited to, water, antimicrobial agents, viscosity modifiers, and the like. In one example, the post-treatment fluid may be predominantly water. Antimicrobial agents, such as biocides and fungicides, may be added to inhibit the growth of harmful microorganisms Example antimicrobial agents may include, but are not limited to, NUOSEPT® series (Ashland Inc.). UCARCIDE™ (Dow Chemical Co.), and PROXEL® (Arch Chemicals), and combinations thereof.

The ink sets of the present disclosure may provide improved printing performance characteristics over comparative examples. For example, as used herein, "black print optical density change" or "KODΔ" refers to the change in optical density of the sample after it is rubbed with damp cloth under a controlled weight. For various examples on coated offset glossy media, the ink set can provide for a KODΔ of 0.13 or less after a wet rub test, a KODΔ of 0.09 or less after a tape adhesion resistance test using a standard tape applied and removed by hand, and a KODΔ of 0.02 or less after Sutherland Rub test using a Sutherland Rub tester with a 4 lb weight for 20 cycles on the print. For various examples on coated thin matte media, the ink set can provide tor a KODΔ of 0.04 or less after a wet rub test, a KODΔ of 0.08 or less after a tape adhesion resistance test using a standard tape applied and removed by hand, and a KODΔ of 0.06 or less after Sutherland Rub test using a Sutherland Rub tester with a 4 lb weight for 20 cycles on the print. For various examples on uncoated plain paper, the ink set can provide for a KODΔ of 0.18 or less after a wet rub test, and a KODΔ of 0.06 or less after Sutherland Rub test using a Sutherland Rub tester with a 4 lb weight for 20 cycles on the print. For various examples on white kraft paper, the ink set can provide (or a KODΔ of 0.59 or less after a wet rub (2 minute cycle), and a KODΔ of 0.32 or less after Sutherland Rub test using a Sutherland Rub tester with a 4 lb weight for 20 cycles on the print.

The inkjet ink sets of the present disclosure may be incorporated into various apparatuses or systems for inkjet printing, such as printers, and may be suitable for use on many types of substrates of recording media, including but not limited, plain paper, glossy media, porous media, nonporous media, offset media, cartons/packaging, etc. In some implementations, the ink set may comprise a first inkjet ink cartridge containing the pre-treatment fixing fluid, at least one second inkjet ink cartridge containing the ink, and a third inkjet ink cartridge containing the post-treatment fluid. In various implementations, the ink set may comprise at least one other ink cartridge containing another ink.

In addition to the ink sets described herein, the present disclosure provides for methods relating thereto. Generally, a method of producing images on media may comprise separately inkjetting onto the media, in order, a pre-treatment fixing fluid, an ink, and a post-treatment fluid including a wax and a binder present in the post-treatment fluid in a range of about 10 weight percent to about 30 weight percent. In various implementations, the pre-treatment fixing fluid and post-treatment fluid are devoid of colorant, and the ink is devoid of metal sell and binder.

In various implementations, the post-treatment fluid may be inkjetted after the pre-treatment fixing fluid and the ink have dried. In some of these implementations, one or more drying operations may be performed after the pre-treatment fixing fluid and the ink have been inkjetted. The drying operation(s) may be performed at ambient temperature or under heat. For example, the drying operation may be performed at about 80° C., or in some examples, at about 100° C., or still further examples, at 80° C. and then at 100° C.

In other implementations, the post-treatment fluid may be inkjetted while the ink and the pre-treatment fixing fluid are still wet and have not completely dried. In some of these implementations, one or more drying operations may be performed after the pre-treatment fluid, the ink, and the post-treatment fluid have been inkjetted. The drying operation(s) may be performed at ambient temperature or under heat. For example, the drying operation may be performed at about 80° C., or in some examples, at about 100° C., or still further examples, at 80° C. and then at 100° C.

In various implementations, the pre-treatment fixing fluid may be inkjetted by a first inkjet ink cartridge, the ink may be inkjetted by a second inkjet ink cartridge, and the post-treatment fluid may be inkjetted by a third inkjet ink cartridge.

EXAMPLES

The following are illustrative examples of inkjet ink sets within the scope of the present disclosure. It is to be understood that experimental data provided does not limit the scope of the embodiments. Rather, the data merely illustrate the preparation of composition embodiments in accordance with the subject disclosure as well as for demonstrating the properties described above illustrating the usefulness of the inkjet ink sets.

Example 1—Pre-Treatment Fixing Fluid

A pre-treatment fixing fluid for an ink set was prepared using the Compositional Components at the concentrations listed in TABLE 1.

TABLE 1

| Compositional Components | Pre-Treatment Fixing Fluid (wt %) |
|---|---|
| Calcium Propionate | 8.5 |
| SURFYNOL ® SE-F | 0.05 |
| Tetraethylene Glycol | 12.0 |
| Methanesulfonic Acid | 0.38 |
| Biocide | 0.2 |
| Water | Balance |

Example 2—Ink

An ink for an ink set was prepared using the Compositional Components at the concentrations listed in TABLE 2.

TABLE 2

| Compositional Components | Ink (wt %) |
|---|---|
| Carbon Black Pigment | 3.0 |
| Styrene/Acrylic Dispersant | 1.50 |
| 2-hydroxyethyl-2-pyrrolidone | 6.0 |
| TEGO ® Wet 510 | 0.45 |
| Biocide | 0.2 |
| Water | Balance |

Example 3—Post-Treatment Fluids

Post-treatment fluids (PTF) A, B, C, D, and E for ink sets were prepared using the Compositional Components at the concentrations listed in TABLE 3.

TABLE 3

| Compositional Components | PTF A (wt %) | PTF B (wt %) | PTF C (wt %) | PTF D (wt %) | PTF E (wt %) |
|---|---|---|---|---|---|
| Styrene/Acrylic Latex (acid no. <10, dispersed with anionic sulfate surfactant, Tg 106° C., partide size 220 nm) | 12 | 12 | 20 | — | — |
| Styrene/Acrylic Latex (acid no. <10, dispersed with DOWFAX ™ 8390 surfactant, Tg 80° C., particle size 163 nm) | — | — | — | 12 | — |
| Styrene/Acrylic Latex (acid no. <10, dispersed with anionic sulfate surfactant, coreshell with Tg 83° C., particle size 183 nm) | — | — | — | — | 12 |
| 2-hydroxyethyl-2-pyrrolidone | 1.5 | 7 | 7 | 7 | 7 |
| DANTOCOL ™ DHE | 9 | 7 | 7 | 7 | 7 |
| UNITHOX ™ 480 | 1 | 0.5 | 0.5 | 0.5 | 0.5 |
| LIQUILUBE ™ 405 | 1.50 | 1.50 | 1.50 | 1.50 | 1.50 |
| TEGO ® Wet 510 | 0.60 | 0.60 | 0.60 | 0.60 | 0.60 |
| Biocide | 0.20 | 0.20 | 0.20 | 0.20 | 0.20 |
| Water | Balance | Balance | Balance | Balance | Balance |

Example 4—Ink Set Characterization 1

Four ink sets were prepared using the pre-treatment fixing fluid of Example 1, the ink of Example 2, and various ones of the post-treatment fluids of Example 3. The ink sets were printed on coated offset glossy media under the same printing conditions and tested, with the results shown in TABLE 4.

The wet rub was performed with a Taber® 5750 Linear Abraser using a water wet cloth to wipe the print one 2-minute cycle with 250 g force. The Sutherland Rub was performed using a Sutherland Rub tester with a 4 lb weight for 20 cycles on the print. The tape test measured tape adhesion using a standard tape applied by hand and removed. The KODΔ was measured using an X-rite 500 series Spectrodensitometer.

TABLE 4

| Print Fluid | KODΔ (Wet Rub) | KODΔ (Sutherland Rub) | KODΔ (Tape) |
|---|---|---|---|
| Pre-Treatment Fluid/Ink/PTF A | 0.01 | 0.02 | 0.07 |
| Pre-Treatment Fluid/Ink/PTF B | 0.13 | 0.02 | 0.09 |
| Pre-Treatment Fluid/Ink/PTF C | 0.09 | 0.00 | 0.05 |
| Pre-Treatment Fluid/Ink/PTF D | 0.07 | 0.03 | 0.09 |

Example 5—Comparative Ink with Binder and Comparative Ink with Fixing Fluid

Comparative Ink 1 was formulated according to the ink of Example 2, except that Comparative Ink 1 contained a polyurethane binder and a fixing fluid Comparative Ink 2 was formulated according to the ink of Example 2, except that Comparative Ink 2 contained a fixing fluid Comparative Ink 1 and Comparative Ink 2 were printed on coated offset glossy media under the same printing conditions as the ink sets of Example 4, and tested using the same testing conditions, with the results shown in TABLE 5.

TABLE 5

| Print Fluid | KODΔ (Wet Rub) | KODΔ (Sutherland Rub) | KODΔ (Tape) |
|---|---|---|---|
| Comparative Ink 1 (with Binder and Fixing Fluid) | 1.07 | 0.05 | 0.89 |
| Comparative Ink 2 (with Fixing Fluid) | 1.12 | 0.25 | 0.78 |

Example 6—Ink Set Characterization 2

An ink set was prepared using the pre-treatment fixing fluid of Example 1, the ink of Example 2, and PTF A of Example 3. The ink set, along with Comparative Ink 1 and Comparative Ink 2 of Example 5, were printed on coated thin matte media under the same printing conditions and tested, with the results shown in TABLE 6.

The wet rub was performed with a Taber® 5750 Linear Abraser using a water wet cloth to wipe the print one 2-minute cycle with 250 g force. The Sutherland Rub was performed using a Sutherland Rub tester with a 4 lb weight for 20 cycles on the print. The tape test measured tape adhesion using a standard tape applied by hand and removed. The KODΔ was measured using an X-rite 500 series Spectrodensitometer.

TABLE 6

| Print Fluid | KODΔ (Wet Rub) | KODΔ (Sutherland Rub) | KODΔ (Tape) |
|---|---|---|---|
| Comparative Ink 1 (with Binder and Fixing Fluid) | 0.17 | 0.05 | 0.23 |
| Comparative Ink 2 (with Fixing Fluid) | 0.32 | 0.06 | 0.56 |
| Pre-Treatment Fluid/Ink/PTF A | 0.04 | 0.06 | 0.08 |

Example 7—Ink Set Characterization 3

An ink set was prepared using the pre-treatment fixing fluid of Example 1, the ink of Example 2, and PTF A of Example 3. The ink set along with Comparative Ink 1 and Comparative Ink 2 of Example 5, were printed on uncoated plain paper under the same printing conditions and tested, with the results shown in TABLE 7.

The wet rub was performed with a Taber® 5750 Linear Abraser using a water wet cloth to wipe the print one 2-minute cycle with 250 g force. The Sutherland Rub was performed using a Sutherland Rub tester with a 4 lb weight for 20 cycles on the print. The tape test measured tape adhesion using a standard tape applied by hand and removed. The KODΔ was measured using an X-rite 500 series Spectrodensitometer.

TABLE 7

| Print Fluid | KODΔ (Wet Rub) | KODΔ (Sutherland Rub) |
|---|---|---|
| Comparative Ink 1 (with Binder and Fixing Fluid) | 0.32 | 0.05 |
| Comparative Ink 2 (with Fixing Fluid) | 0.29 | 0.01 |
| Pre-Treatment Fluid/Ink/PTF A | 0.18 | 0.06 |

Example 8—Ink Set Characterization 4

An ink set was prepared using the pre-treatment fixing fluid of Example 1, the ink of Example 2, and PTF A of Example 3. The ink set, along with Comparative Ink 1 and Comparative Ink 2 of Example 5, were printed on white kraft media (cartons/packaging) under the same printing conditions and tested, with the results shown in TABLE 8.

The wet rub was performed with a Taber® 5750 Linear Abraser using a water wet cloth to wipe the print one 2-minute cycle with 250 g force. The Sutherland Rub was performed using a Sutherland Rub tester with a 4 lb weight for 20 cycles on the print. The tape test measured tape adhesion using a standard tape applied by hand and removed. The KODΔ was measured using an X-rite 500 series Spectrodensitometer.

TABLE 9

| Print Fluid | KODΔ (Wet Rub) | KODΔ (Sutherland Rub) |
|---|---|---|
| Comparative Ink 1 (with Binder and Fixing Fluid) | 1.07 | 0.78 |
| Comparative Ink 2 (with Fixing Fluid) | 0.77 | 0.89 |
| Pre-Treatment Fluid/Ink/PTF A | 0.59 | 0.32 |

Example 9—Ink Set Characterization 5

An ink set was prepared using the pre-treatment fixing fluid of Example 1, the ink of Example 2, and PTF A of Example 3. A sample was prepared by printing the ink set on coated offset paper.

Comparative examples were also prepared. A web press example ("Web Press") was prepared with a commercial web press using a fixer and ink on coated offset paper. Another example ("Fixer with Binder/Ink") was prepared with an inkjet printer using a fixer with binder followed by ink, on coated offset paper. A final example ("Offset") was prepared with an analog offset press using offset ink on coated offset paper.

The ink set sample and the comparative examples were tested with the results shown in TABLE 10.

The wet rub was performed with a Taber® 5750 Linear Abraser using a water wet cloth to wipe the print one 2-minute cycle with 250 g force. The Sutherland Rub was performed using a Sutherland Rub tester with a 4 lb weight for 20 cycles on the print. The tape test measured tape adhesion using a standard tape applied by hand and removed. The KODΔ was measured using an X-rite 500 series Spectrodensitometer.

TABLE 10

| Print Fluid | KODΔ (Wet Rub) | KODΔ (Sutherland Rub) | KODΔ (Tape) |
|---|---|---|---|
| Pre-Treatment Fluid/Ink/PTF Sample | 20 mOD | 4 | 60 mOD |
| Web Press | 640 mOD | 3 | 440 mOD |
| Fixer with Binder/Ink | 15 mOD | 4 | n/a |
| Offset | 0 mOD | 4 | 0 mOD |

Although certain implementations have been illustrated and described herein, it will be appreciated by those of ordinary skill in the art that a wide variety of alternate and/or equivalent implementations calculated to achieve the same purposes may be substituted for the implementations shown and described without departing from the scope of this disclosure. Those with skill in the art will readily appreciate that implementations may be implemented in a wide variety of ways. This application is intended to cover any adaptations or variations of the implementations discussed herein.

It is manifestly intended, therefore, that implementations be limited only by the claims and the equivalents thereof.

What is claimed is:

1. An ink set, comprising:

a first inkjet ink cartridge containing a pre-treatment fixing fluid including a metal salt;

at least one second inkjet ink cartridge containing an ink including an ink colorant and an ink vehicle, the ink being devoid of any binder; and a third inkjet ink cartridge containing a post-treatment fluid including a wax and a latex binder selected from the group consisting of an acrylic polymer, a styrene acrylic copolymer, a vinyl acetate polymer, a polyester polymer, a vinylidene chloride polymer, a butadiene polymer, a styrene-butadiene copolymer, an acrylonitrile-butadiene copolymer, and mixtures thereof, the latex binder having a weight average molecular weight ranging from about 100,000 to about 500,000, the latex binder being present in the post-treatment fluid in a range of about 20 weight percent to about 30 weight percent;

wherein the ink set is adapted for separate inkjetting of the pre-treatment fixing fluid, the ink, and the post-treatment fluid onto a medium.

2. The ink set of claim 1, wherein the wax is present in the post-treatment fluid in a range of about 0.5 weight percent to about 2.5 weight percent.

3. The ink set of claim 1, wherein the metal salt includes a polyvalent metal cation selected from a group consisting of $Ca^{2+}$, $Mg^{2+}$, or $Zn^{2+}$, and mixtures thereof.

4. The ink set of claim 1, wherein the ink colorant is a pigment.

5. The ink set of claim 1, wherein the ink set includes a plurality of other inks, each including an ink colorant and an ink vehicle.

6. The ink set of claim 1, wherein the metal salt is present in the pre-treatment fixing fluid in a range of about 3 weight percent to about 10 weight percent, and the wax is present in the post-treatment fluid in a range of about 0.5 weight percent to about 2.5 weight percent.

7. The ink set of claim 1 wherein the latex binder has an average particle diameter ranging from about 10 nm to about 500 nm.

8. The ink set of claim 1 wherein the pre-treatment fixing fluid is devoid of any binder.

9. A method of producing images on media using an ink set adapted for separate inkjetting of a pre-treatment fixing fluid, an ink, and a post-treatment fluid, the method comprising:

separately inkjetting onto the media, in order, the pre-treatment fixing fluid contained in a first inkjet ink cartridge and including a metal salt, the ink contained in at least one second inkjet ink cartridge, including an ink colorant and an ink vehicle, and being devoid of any binder, and the post-treatment fluid contained in a third inkjet ink cartridge and including a wax and a latex binder selected from the group consisting of an acrylic polymer, a styrene acrylic copolymer, a vinyl acetate polymer, a polyester polymer, a vinylidene chloride polymer, a butadiene polymer, a styrene-butadiene copolymer, an acrylonitrile-butadiene copolymer, and mixtures thereof, the latex binder having a weight average molecular weight ranging from about 100,000 to about 500,000, and the latex binder being present in the post-treatment fluid in a range of about 20 weight percent to about 30 weight percent.

10. The method of claim 9, wherein said inkjetting the post-treatment fluid comprises inkjetting the post-treatment fluid after the pre-treatment fixing fluid and the ink dry.

11. The method of claim 10, further comprising performing a drying operation after said inkjetting the ink, before said inkjetting the post-treatment fluid.

12. The method of claim 9, wherein said inkjetting the post-treatment fluid is performed before the ink and the pre-treatment fixing fluid substantially dry.

13. The method of claim 9, wherein said inkjetting the pre-treatment fixing fluid comprises inkjetting the pre-treatment fixing fluid by the first inkjet ink cartridge, wherein said inkjetting the ink comprises inkjetting the ink by the at least one second inkjet ink cartridge, and wherein said inkjetting the post-treatment fluid comprises inkjetting the post-treatment by the third inkjet ink cartridge.

* * * * *

UNITED STATES PATENT AND TRADEMARK OFFICE

CERTIFICATE OF CORRECTION

PATENT NO. : 9,822,276 B2
APPLICATION NO. : 14/900380
DATED : November 21, 2017
INVENTOR(S) : Elizabeth Ann Visnyak et al.

It is certified that error appears in the above-identified patent and that said Letters Patent is hereby corrected as shown below:

On the Title Page

Item (74), Attorney, Agent or Firm, in Column 2, Line 1, delete "Dieker & Kavanaugh" and insert -- Dierker & Kavanaugh --, therefor.

Signed and Sealed this
Twenty-fourth Day of April, 2018

Andrei Iancu
*Director of the United States Patent and Trademark Office*